United States Patent [19]

Guelin et al.

[11] Patent Number: 5,047,634

[45] Date of Patent: Sep. 10, 1991

[54] METHOD AND DEVICE TO MEASURE THE CONCENTRATION OF THE VARIOUS ISOTOPES OF RADON IN A GASEOUS ATMOSPHERE

[75] Inventors: Michel Guelin, Briis Sous Forges; Jacqueline Le Gac, Le Mesnil St Denis; Jean Charuau, Les Ulis, all of France

[73] Assignee: Commissariat a l'Energie Atomique, Paris, France

[21] Appl. No.: 528,941

[22] Filed: May 25, 1990

[30] Foreign Application Priority Data

May 30, 1989 [FR] France .................... 89 07109

[51] Int. Cl.$^5$ .............................................. G01T 7/02
[52] U.S. Cl. .................................... 250/255; 250/435
[58] Field of Search ............... 250/253, 255, 432 R, 250/435

[56] References Cited

U.S. PATENT DOCUMENTS

| | | | |
|---|---|---|---|
| 3,922,555 | 11/1975 | Chapuis et al. | 250/472.1 |
| 3,953,737 | 4/1976 | Neeb | 250/432 R |
| 3,968,371 | 7/1976 | Greendale | 250/380 |
| 4,185,199 | 1/1980 | Droullard et al. | 250/435 |
| 4,451,736 | 5/1984 | Cameron | 250/376 |
| 4,801,800 | 1/1989 | Scheible | 250/255 |
| 4,868,386 | 9/1989 | Ilmasti | 250/253 |
| 4,880,973 | 11/1989 | Reynolds | 250/253 |
| 4,891,514 | 1/1990 | Gjerdrum et al. | 250/255 |
| 4,894,535 | 1/1990 | Madnick et al. | 250/255 |
| 4,912,323 | 5/1990 | Bhat et al. | 250/252.1 |
| 4,926,053 | 5/1990 | Dempsey et al. | 250/376 |

FOREIGN PATENT DOCUMENTS 0280416  8/1988  European Pat. Off. .

*Primary Examiner*—Constantine Hannaher
*Assistant Examiner*—Jacob M. Eisenberg
*Attorney, Agent, or Firm*—Pearne, Gordon, McCoy & Granger

[57] ABSTRACT

Device to implement the method according to claim 1, wherein it is constituted of a vessel (2) provided with an intake tube (4) and an evacuation tube (8) for the gaseous atmosphere and whose inside forms the closed sampling space, is subdivided into a large number of small elementary intercommunicating volumes so as to enable the taken gaseous sample to be homogenized, as well as to allow for the diffusion and the spatially homogeneous trapping of all the solid daughter products thus constituting a homogeneous emitting source for the spectrometry chain which examines this source from outside.

7 Claims, 3 Drawing Sheets

METHOD AND DEVICE TO MEASURE THE CONCENTRATION OF THE VARIOUS ISOTOPES OF RADON IN A GASEOUS ATMOSPHERE

FIELD OF THE INVENTION

The present invention generally concerns the measurement of the volume activity of an atmosphere containing radon gas present in its various isotopic varieties $R_n{}^{222}$, $R_n{}^{220}$ and $R_n{}^{219}$, as well as their natural transmitting daughter products $\alpha$ and $\beta$, the latter being accompanied by a radiation of $\gamma$ rays and which, in normal conditions, are in their solid state.

BACKGROUND OF THE INVENTION

The methods currently known to analyse the activity of a gaseous sample containing the various isotopes of radon and their daughter products relate to two major categories, but neither of these categories makes it possible to carry out this measurement in a discriminatory way, that is, by allocating to each isotope and its own daughter products the share of activity returning to them in the examined gaseous atmosphere sample.

The known methods for measuring the activity of radon atoms, these methods being overall nondiscriminatory measurements, essentially rely on two different physical principles, namely:

1) ionization of the air produced in a circulation chamber by radiations emitted by the isotopes of radon and their daughter products;

2) the action of the particles $\alpha$ emitted by the daughter products of the radon on a surface rendered sensitive for this purpose.

Neither of these two methods makes it possible to easily and precisely determine the isotopic distribution of the various radons $Rn^{222}$, $Rn^{220}$ and $Rn^{219}$.

In fact, in the measurements which use the air ionization method, this ionization is evaluated with the aid of the current it creates between the conductive armature of a cylindrical ionization chamber and the axial electrode between which a suitable potential difference is applied. The main drawback of this method is that a current is used which is the result of ionizing the ambient air by all the radioactive transmitters contained in the taken sample. Now, for a given volume activity of a certain atmosphere sample, the ionization current varies with the energy of the radiation which has provoked ionization. As, by definition, the isotopic distribution of the various radons is not known, the measurement of the volume activity may not be strictly accurate.

In those methods using the interaction of particles on a sensitive surface, the measurement of the volume activity of the radon is often carried out by means of scintillating flasks previously placed in a vacuum. These flasks are glass vessels whose inner wall, except for the bottom, is coated with a scintillating material, such as zinc sulphide activated with silver. The gas corresponding to the atmosphere to be analysed is then introduced through the stopper of the flask by means of a hypodermic needle.

The measurement itself is only carried out after a certain time for placing the radon in equilibrium with its various solid daughter products, the latter then being secured to the walls of the vessel. The interaction of particles $\alpha$ with the scintillating material by these same solid daughter products produces photons which are taken into account and measured by a photoelectron multiplier placed under the bottom of the flask so as to then be analysed by a suitable electronic device. This routine laboratory practical technique also has two major drawbacks.

Firstly, no more than the previous method, this technique does not make it possible to dissociate the respective activities of the isotopes $Rn^{222}$, $Rn^{220}$ and $Rn^{219}$ of the radon, since the pulses of the three isotopic daughter products cannot be discriminated by the photoelectron multiplier.

Secondly, in order to arrive at the value of the volume activity of the isotopes of the radon, it is necessary to assume that the solid daughter products are distributed homogeneously over the internal wall of the flask so as to embody a geometry for measuring this activity able to be reproduced from one experiment to another. This introduces an additional element of uncertainty concerning the measurement of the volume activity of the isotopes of the radon.

SUMMARY OF THE INVENTION

The specific object of the present invention is to provide a method and device to measure the concentration of the various isotopes of radon at equilibrium in a gaseous atmosphere. This method and device simply and effectively overcome the previous drawbacks of the methods of the prior art.

The method for measuring the concentration in a gaseous atmosphere of the various isotopes of radon, such as $Rn^{222}$, $Rn^{220}$ and $Rn^{219}$, is characterized in that it consists of collecting and homogeneously distributing in a closed sampling space containing a sample of this atmosphere the solid daughter products of these isotopes and of carrying out outside this space a spectrometry of the radiations $\gamma$ ray they transmit.

In other words, the method of the invention improves the methods of the prior art by carrying out a spectrometric measurement on the solid daughter products of three isotopes of radon after having distributed them homogeneously in a sealed sampling volume analysed from outside with a $\gamma$ ray spectrometer. The spectrometric chain used in the method of the invention thus analyses a homogeneous volume distribution of the solid daughter products of a gaseous atmosphere in which the isotopes of radon and their various daughter products are found at equilibrium. As the energy of the radiations of the daughter products is clearly classified by physicists, the $\gamma$ ray spectrometer makes it possible to allocate the activity part which returns to each of the isotopes of the radon without any mistake of identity being able to occur.

The object of the present invention is also to provide a device to implement the aforementioned measuring method. Said device is characterized in that it is constituted by a vessel provided with an atmosphere intake tube and an atmosphere evacuation tube and whose inside forming the closed sampling space is subdivided into a large number of small identical intercommunicating elementary volumes, to allow for homogenization of the taken gaseous sample, as well as making it possible to spatially homogeneously diffuse and trap all the solid daughter products, thus constituting a homogeneous transmitting volume $\gamma$ ray source for the $\gamma$ ray spectrometer which analyses this source from the outside.

As can be easily seen, the basic inventive idea resulting in the production of this new device consists of subdividing the sampling volume of the atmosphere to be analysed into a large number of identical small elementary volumes in which the solid daughter products are trapped on the most extensive surface as possible. Of course, these small adjacent volumes must not obstruct the flow of the gas or the diffusion of the solid atoms of the daughter products in the sampling volume and this is why they need to communicate with one another.

According to one preferred characteristic of the invention, it is useful to constitute the delimitation surfaces of the previous small elementary volumes with the aid of electricity conducting materials so as to permit the flowing of current loads and avoid any heterogeneity of the deposit of the solid atoms which could result from the appearance of electrostatic forces inside the sampling volume.

In one particularly advantageous embodiment of the present invention, the subdivision of the inside of the vessel into a large number of small identical intercommunicating elementary volumes is effected by a multilayer structure with materials having an open-worked texture. As indicated, these grids are preferably good conductors of current loads, this being the reason they are made of a metal and preferably aluminium, so as to attenuate the $\gamma$ ray radiation as little as possible. In a structure of this type, the elementary cells or volumes are each constituted by two superimposed prisms having a common base and opposing right angle edges.

Without departing from the context of the present invention, it is also possible to embody this subdivision of the interior of the vessel into small elementary intercommunicating volumes by any other available device, such as by using a structure with several flat perforated disks disposed parallel to the bottom of the vessel and kept at a constant distance by braces, or even by a metal plate wound into the shape of a spiral with spacing at each turn and disposed along the axis of revolution of a revolution cylindrical vessel, or even by a stacking of microballs made of metal, glass or a polymer, such as polystyrene.

BRIEF DESCRIPTION OF THE DRAWINGS

The invention shall be more readily understood by referring to the following description of an implementation example, described more particularly by way of non-restrictive illustration with reference to the accompanying FIGS. 1 to 4 in which.

DETAILED DESCRIPTION OF THE PREFERRED EMBODIMENTS

Figure 1:
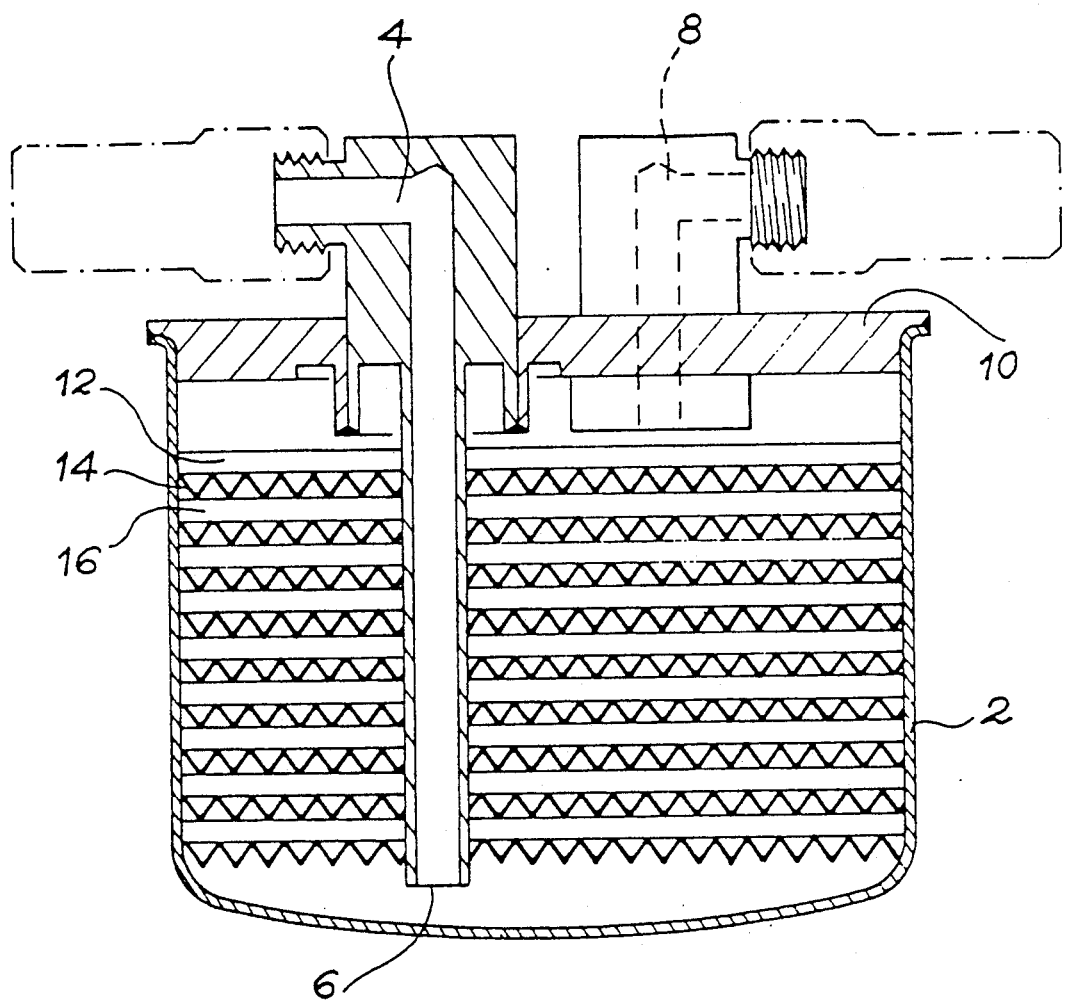
FIG. 1 is a section along the axis of a vessel equipped with two families of grids accordion-folded at a right angle according to the invention.

FIG. 1 shows a cutaway view of a device of the invention used to measure the concentration of the various isotopes of the radon. This device mainly comprises a vessel 2 provided with an intake tube 4 opening at 6 near the bottom of the vessel 2 and an outlet tube 8 so as to introduce inside the vessel 2 the atmosphere sample to be analysed. A cover 10 imperviously closes the vessel 2 at its upper section.

According to the invention, the vessel comprises in its lower section a stacking of stages, such as 12, 14, 16 etc., of metal microgrids pleated into the shape of an accordion, these microgrids having their pleating direction at a right angle from one stage to another, as seen on the three stages referenced 12, 14 and 16.

Figure 2:
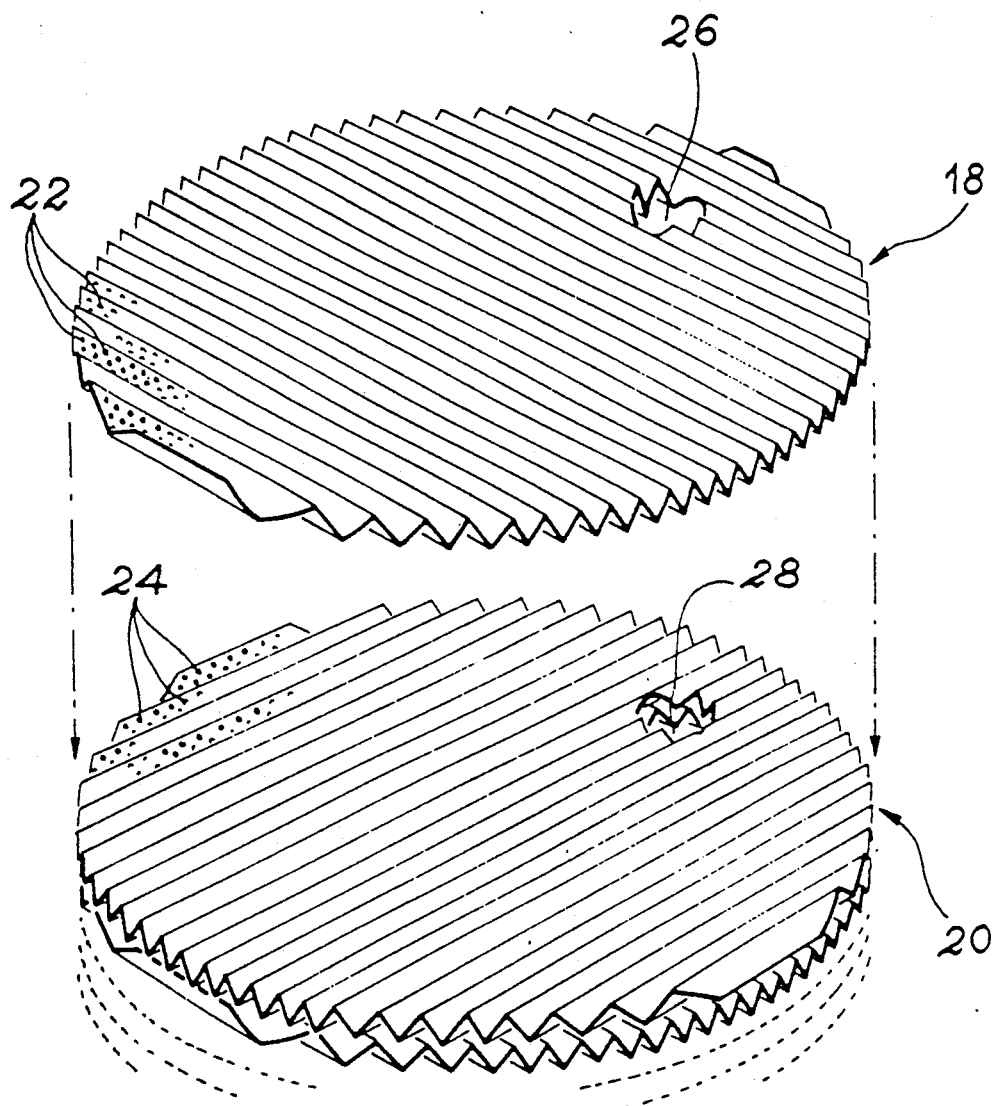
FIG. 2 diagrammatically represents the way in which the grids of each stage of the stacking are superimposed.

FIG. 2 diagrammatically shows the stacking of the preceding stages, only two of said stages, namely respectively the stage 18 and the stage 20, having been represented and having right angle pleating directions. This figure also partially shows at 22 and 24 the perforations of the metal grids constituting the pleated sheets. So as to allow for penetration of the intake tube 4 through the system of grids, orifices 26 and 28 are cut into each of them, these orifices all being situated in the projection when the stacking is embodied in the housing 2.

By way of example, the vessel may easily be constituted with the aid of a container with a volume of about 500 cm$^3$ and constitutes the various aluminium microballs 18 and 20 in the form of microballs obtained by deployment produced by the METAL DEPLOYE company.

Again by way of example, the aforesaid microballs may have a thickness of about 0.25 mm, a frontal transparency of 23% and a hole diameter of 0.35 mm. The number of stages in the example of FIG. 1 is 18, the pleated microgrids being successively stacked with a rotation of 90° from one stage to another. The preceding disposition thus results in embodying several thousand cells having the shape of a volume delimited by two prisms having a common base and whose unit volume is close to $5.10^{-2}$ cm$^3$.

Furthermore, owing to the internal disposition in stages of the container 2, the initial deposit surface of the solid daughter products of the radon is multiplied by a factor of more than 10. As regards the aluminium material used, it only occupies about 10% of the internal volume of the vessel 2. By virtue of the small thickness of the grids and the density of the selected material, the attenuation of the $\gamma$ ray radiation originating from the deposit is negligible.

Figure 3:
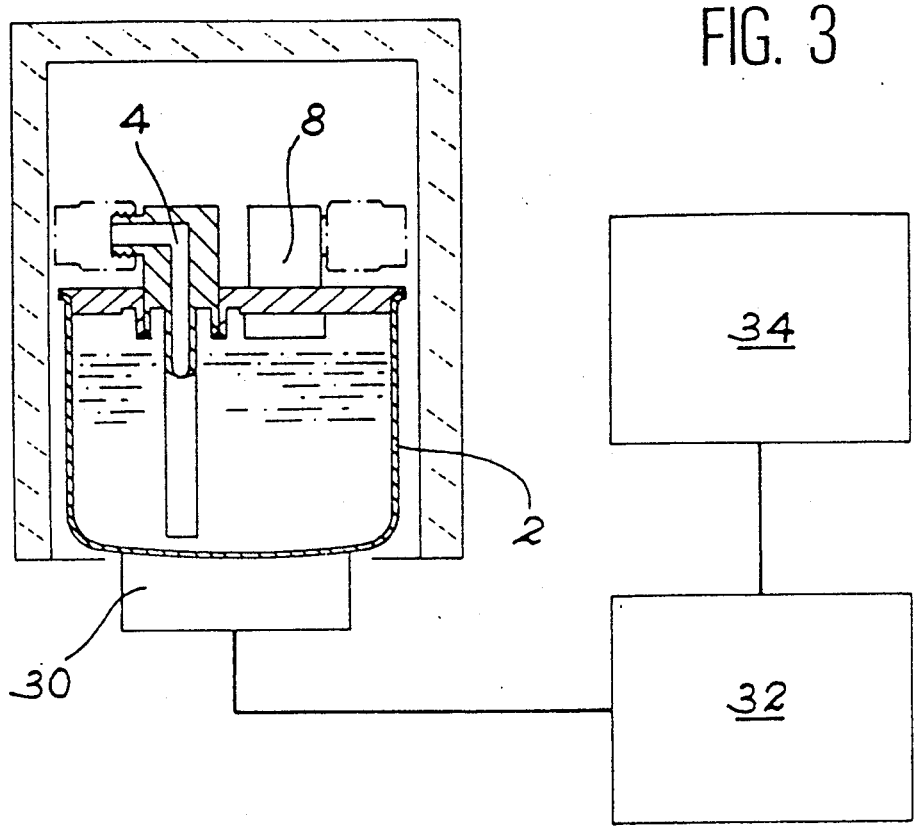
FIG. 3 shows the device of FIG. 1 equipped with its $\gamma$ ray spectrometer.

FIG. 3 diagrammatically shows the device of the invention in its complete form which connects the vessel 2, assumed to be filled with the pleated grids (not shown in full), to a complete $\gamma$ ray spectrometer comprising a detector 30, associated electronics 32 and a multichannel analyzer 34. In the embodiment of FIG. 3, the detector accordingly examines the volume activity of the inside of the container 2 through the bottom of this container.

So as to use the device of FIG. 3 or any other variant of this device, the method starts by opening the tubes 4 and 8 so as to fill the vessel 2 with a sample of the gaseous atmosphere to be examined and then closing these same two tubes. Then sufficient time is allowed to elapse, such as three hours, so that the radioactive equilibrium is established between the various daughter products of the radioactive isotopes and so that the solid particles comprising them are homogeneously distributed throughout the volume of the vessel 2 through small elementary volumes. It is then possible to measure the $\gamma$ ray activity with the aid of the chain 30, 32 and 34.

Figure 4:
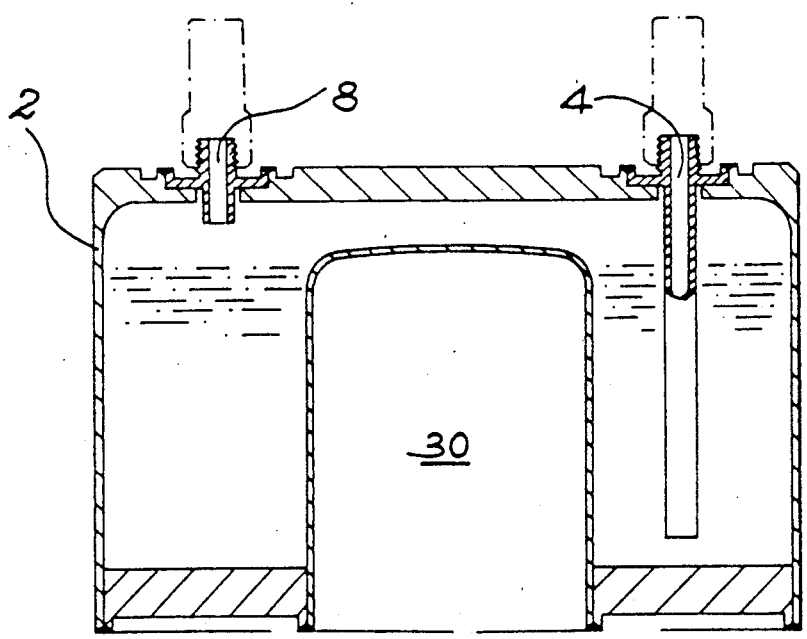
FIG. 4 shows one possible variant of the shape of the vessel constituting the device of the invention.

In another implementation variant also possible in the invention and to be described with reference to FIG. 4, the container 2, still equipped with its grids (not completely shown), is constituted in a ring shape with a central stacking for the detector 30. A technician would select from each particular case according to the results he hopes to obtain the shape of the container 2 and the location of the detector 30 with respect to the volume in which the volume activity of γ is measured.

Of course and as already indicated earlier, other systems or devices for filling the container 2 are possible with, for example, multilayer laminated materials having an open-worked texture, such as perforated flat disks, or also spirals obtained from the winding of a metal plate, or from the stackings of balls.

For the requirements of the invention, the γ ray spectrometer needs to be calibrated for the geometry of the sampling volume used and for the gamma energy spectrum corresponding to the daughter products of the radon. Practically speaking, it is possible to have the sampling volume filled by the Laboratory de Métrologie des Rayonnements Ionisants (referenced at the Bureau National de Métrolgie) with a mixture of multigamma radioactive krypton 85 and xenon 127 gases.

What is claimed is:

1. Method to measure the concentration in a gaseous atmosphere of the isotopes of radon, including $Rn^{222}$, $Rn^{220}$ and $Rn^{219}$, wherein it consists of collecting and homogeneously distributing in a closed sampling space containing a sample of this atmosphere the solid daughter products of these isotopes and of carrying out outside this space a spectrometry of the γ ray radiations they emit.

2. Device to implement the method according to claim 1, wherein it is constituted by a vessel provided with an intake tube and an evacuation tube for the gaseous atmosphere and whose inside forms the closed sampling space, said device being subdivided into a plurality of small intercommunicating elementary volumes so as to allow for homogenization of the taken gaseous sample, as well as to allow for the spatial and homogeneous diffusion and trapping of all the solid daughter products, thus constituting a homogeneous transmitting volume γ ray source for the γ ray spectrometer which examines this source from the outside.

3. Device according to claim 2, wherein the subdivision of the inside of the vessel into a plurality of intercommunicating identical elementary small volumes is embodied by stacking stages of metal aluminium microgrids pleated into the shape of an accordion and whose pleating direction is at a right angle from one stage to another.

4. Device according to claim 2, wherein the subdivision of the inside of the vessel into a plurality of small intercommunicating elementary volumes is embodied by a multilayer structure consisting of open-worked materials.

5. Device according to claim 2, wherein the subdivision of the inside of the vessel is embodied by the winding of a spiral-shaped metal plate.

6. Device according to claim 2, wherein the subdivision of the inside of the vessel is embodied by a filling with microballs.

7. Device according to any one of claims 2 to 6, wherein the material used for the filling structure is an electrical conductor.

* * * * *